United States Patent [19]

Iijima et al.

[11] Patent Number: 5,617,390

[45] Date of Patent: Apr. 1, 1997

[54] OPTICAL INFORMATION RECORDING MEDIUM HAVING SEPARATE INFORMATION AND REFERENCE INFORMATION PORTIONS AND METHOD USING THE SAME

[75] Inventors: Katsumi Iijima; Shigeyuki Taniwa, both of Yokohama, Japan

[73] Assignee: Canon Kabushiki Kaisha, Tokyo, Japan

[21] Appl. No.: 370,826

[22] Filed: Jan. 10, 1995

Related U.S. Application Data

[63] Continuation of Ser. No. 776,855, Oct. 17, 1991, abandoned, which is a continuation of Ser. No. 456,547, Dec. 26, 1989, abandoned.

[30] Foreign Application Priority Data

Dec. 26, 1988 [JP] Japan .................................. 63-325996
Dec. 15, 1989 [JP] Japan .................................. 1-323944

[51] Int. Cl.⁶ .................................................. G11B 7/00
[52] U.S. Cl. .................................. 369/48; 369/59
[58] Field of Search ............................ 369/48, 59, 32, 369/33, 58, 124, 50, 56, 44.26; 360/48, 51; 365/45, 48

[56] References Cited

U.S. PATENT DOCUMENTS

| | | | |
|---|---|---|---|
| 4,257,111 | 3/1981 | Soohoo et al. | 365/45 |
| 4,375,088 | 2/1983 | de Haan et al. | 369/44.26 |
| 4,499,570 | 2/1985 | Immink et al. | 369/48 |
| 4,710,909 | 12/1987 | Tsuyoshi et al. | 369/44.26 |
| 4,748,611 | 3/1988 | Tsuyoshi et al. | 369/59 |
| 4,835,759 | 5/1989 | Santo et al. | 369/124 |
| 4,868,806 | 9/1989 | Sakagami | 369/58 |
| 4,872,154 | 10/1989 | Sakagami et al. | 369/54 |
| 4,924,447 | 5/1990 | Fuji et al. | 369/124 |
| 4,930,115 | 5/1990 | Verboom et al. | 369/59 |
| 4,961,182 | 10/1990 | Sato et al. | 369/124 |
| 4,967,403 | 10/1990 | Ogawa et al. | 369/44.26 |
| 4,975,897 | 12/1990 | Tanahashi | 369/59 |
| 4,979,159 | 12/1990 | Tsuruoka et al. | 369/58 |
| 4,982,391 | 1/1991 | Sakagami et al. | 369/32 |
| 4,998,009 | 3/1991 | Iijima et al. | 369/58 |

*Primary Examiner*—Thang V. Tran
*Attorney, Agent, or Firm*—Fitzpatrick, Cella, Harper & Scinto

[57] ABSTRACT

The present invention realizes to increase a recording density in an optical information recording medium. The recording medium on which multi-value digital information is recorded includes a mark for forming an identification signal for identifying values of the multi-value digital signal from a reproduction signal obtained upon reproduction of the information recorded in the recording medium. An optically information recording/reproducing method according to the present invention has an information recording step and an information reproducing step. In the information recording step, a reference mark and multi-value digital information are recorded on the recording medium. The reference mark is to form an identification signal used for identifying values of the multi-value digital information from a reproduction signal optically detected from the recording medium. In the information reproducing step, the identification signal is formed from the reference mark and the values of the multi-value digital information is identified from the reproduction signal by the use of the identification signal, and thereby the multi-value digital information is reproduced.

6 Claims, 6 Drawing Sheets

| | CHANNEL 0 | CHANNEL 1 | 250 | 251 | 252 | 253 | 260 | 261 | 262 | 263 | 264 | 265 | 266 | 267 |
|---|---|---|---|---|---|---|---|---|---|---|---|---|---|---|
| A | 1 | 1 | 1 | 0 | 0 | 0 | 1 | 1 | 1 | 1 | 1 | 1 | 1 | 1 |
| B | 1 | 0 | 0 | 1 | 0 | 0 | 1 | 0 | 1 | 1 | 1 | 1 | 1 | 0 |
| C | 0 | 1 | 0 | 0 | 1 | 0 | 0 | 1 | 0 | 1 | 1 | 0 | 1 | 0 |
| D | 0 | 0 | 0 | 0 | 0 | 1 | 0 | 0 | 0 | 1 | 0 | 1 | 0 | 0 |

OPTICAL INFORMATION RECORDING MEDIUM HAVING SEPARATE INFORMATION AND REFERENCE INFORMATION PORTIONS AND METHOD USING THE SAME

This application is a continuation of prior application, Ser. No. 07/776,855 filed Oct. 17, 1991, which application is a continuation of prior application, Ser. No. 07/456,547 filed Dec. 26, 1989, both now abandoned.

BACKGROUND OF THE INVENTION

1. Field of the Invention

The present invention relates to an optical information recording medium and a method of optically recording/reproducing optical information and. More particularly, the present invention relates to an optical information recording medium and a method of optically recording/reproducing information in which data recording density can be substantially increased.

2. Brief Description of the Prior Art

When an information signal is conventionally recorded on an optical recording medium (such as an optical disk or card), a light beam is modulated in accordance with the information signal, and the rotating optical disk (or reciprocating optical card) is irradiated with the modulated beam to form spiral, concentric or linear information tracks consisting of information pits corresponding to the information signal.

Various forms of information pits constituting the information track are known. Recording films of additional write type optical disks utilize information apertures or pits formed; in a metal- or organic-based material, by a change between crystalline and noncrystalline phases, by a change in reflectance upon formation of an alloy, and utilizing a geometric change such as a surface projection or a change in surface state.

Figure 11:
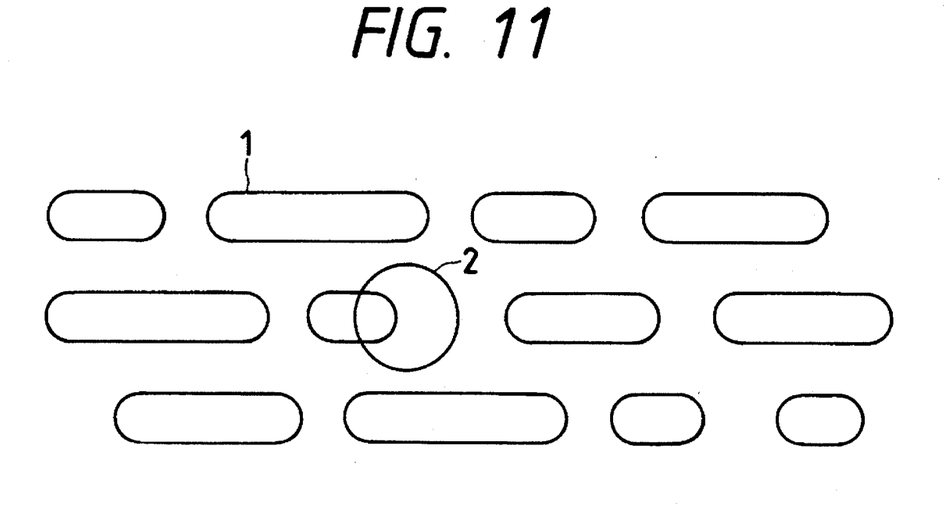
FIG. 11 is a schematic view showing a light beam spot partially condensed on an information pit in the reproduction mode.

Of these forms of information pits, a recessed pit having a depth of $\lambda/4$, i.e., ¼ of a wavelength $\lambda$ of a light beam radiated on an optical recording medium is formed, and information signals are recorded as pits having different lengths. In the reproduction mode, when such a pit is irradiated with a light beam, a beam spot 2 is formed on the optical recording medium, as shown in FIG. 11. Since the size of the beam spot 2 is larger than the width of a pit 1, a beam reflected by the information pit 1 interferes with a beam reflected by a portion outside the information pit 1. When a portion between the information pits 1 is irradiated with the beam spot 2, it is totally reflected. When a light-receiving element of an optical head receives a beam reflected by the optical recording medium, the amount of totally reflected beam which is received is different than the amount of interfering light which is received, thus detecting the presence/absence of the information pit and thereby, an information pit array.

The optical recording medium such as an optical disk or card has many advantages, for instance, in nonvolatile properties, high recording density, noncontact medium access, flexibility, and high-speed access. However, in the technical field concerning image data and especially dynamic images, a strong demand has arisen for additionally increased recording density.

The recording density of any optical recording medium is determined by the size of a light beam spot. For example, when signals are recorded at a track pitch of 1.6 μm and a bit pitch of 1 μm, high density recording at a density of $6.25 \times 10^5$ bits/mm² can be achieved in a conventional optical disk ("Optical Disk", Mori & Kubo, P. 23, the Institute of Electronic Information). This is, however, the upper limit of recording density with these parameters.

As a method of further increasing the recording density, decreases in width of the information track and pitch can both be taken into consideration. However, this requires high-precision techniques for controlling the pitch constant and also, a compatible optical recording/reproducing apparatus.

When information pits constitute an array in a conventional optical recording medium, only one-channel signals are recorded in each information track and so, during reproduction, only one-channel signals are reproduced from each information track. In other words, when optical recording/reproduction is performed using an optical recording medium whose information pits constitute an array, only an information transfer rate can be used.

SUMMARY OF THE INVENTION

It is an object of the present invention in to provide an optical information recording medium and a method of recording/reproducing optical information in which recording density can be substantially increased by increasing the rate of information transfer.

In order to achieve the above object, the present invention provides an information recording medium which includes a mark for forming an identification signal used for identifying values of the multi-value digital information from a reproduction signal and an optical information recording/reproducing method comprising the steps of:

writing reference marks and the multi-value digital information on the medium, the reference marks forming an identification signal which is used for identifying the values of the multi-value digital information from the reproduction signal optically detected from the medium; and/or forming the identification signal from the reference marks and using the identification signal to identify the values of the multi-value digital information from the reproduction signal, thereby reproducing the multi-value digital information.

DETAILED DESCRIPTION OF THE PREFERRED EMBODIMENTS

Figure 1:
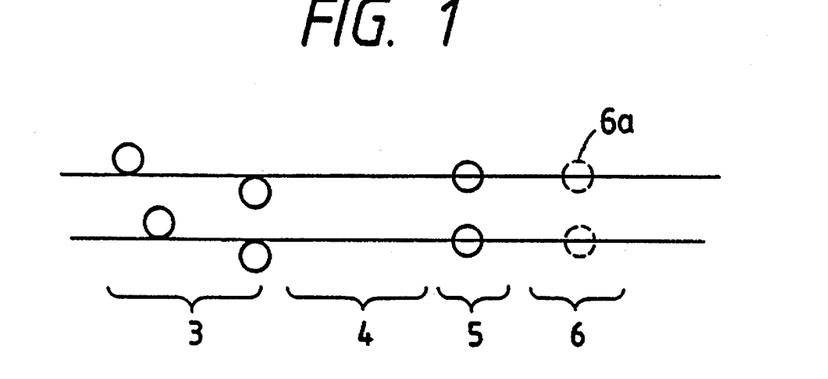
FIG. 1 is a schematic view showing a construction on an optical information recording medium according to an embodiment of the present invention.
Figure 2:
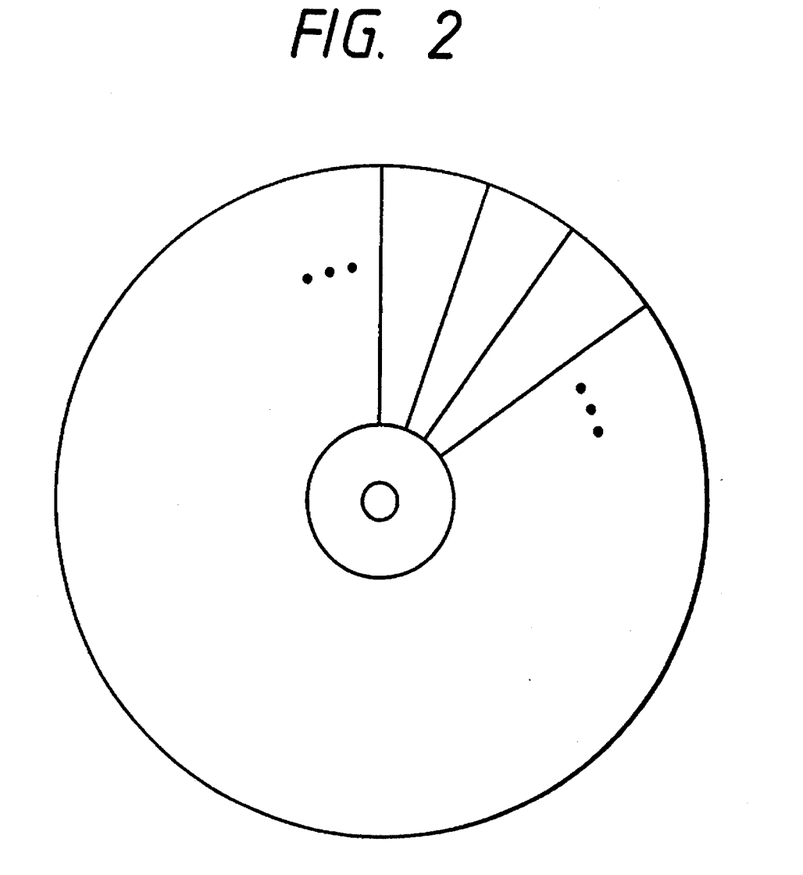
FIG. 2 is a view for explaining sample servo bytes formed on a track of the optical information recording medium according to the present invention.

An embodiment of the present invention will be described with reference to the accompanying drawings. FIG. 2 is a view showing an optical disk as an optical recording medium according to the present invention. Spiral or concentric tracks are formed and are divided into a plurality of sectors. A plurality of sample servo bytes are formed in the tracks of each sector. FIG. 1 illustrates the structure of the sample servo bytes. The sample servo byte consists of an area 3 having pits for auto-tracking (to be referred to as AT hereinafter) an area 4 having a mirror surface for auto-focusing (to be referred to as AF hereinafter), an area 5 having a phase reference (to be referred to as a PLL hereinafter) pit for recording/reproducing, and an area 6 having a reference pit for providing a reproduction signal having a maximum amplitude with respect to other reproduction signals for generating a plurality of reference signals for data reproduction.

A reference pit 6a having a depth ¼ of a laser wavelength $\lambda$ is being formed during the recording mode by controlling a laser power in consideration of the known laser power and the desired pit depth. Therefore, among reproduction signals detected by a detector on the basis of reflected beams in reproduction mode, the reproduction signal obtained by the reference pit 6a corresponds to a maximum amplitude.

Multi-value data recorded in a user data area following the AF area 4 can be quantized in the reproduction mode in accordance with the reproduction signal representing the maximum amplitude from the reference pit 6a and the reproduction signal from the AF area 4 as described in detail below.

In this embodiment, the reference pit 6a is formed so as to immediately succeed the PLL pit 5. An interval between the reference pit 6a and the PLL pit 5 may be arbitrarily determined if these pits can be properly detected.

An apparatus for recording and/or reproducing information using the above medium is schematically described below with reference to FIG. 3.

Figure 3:
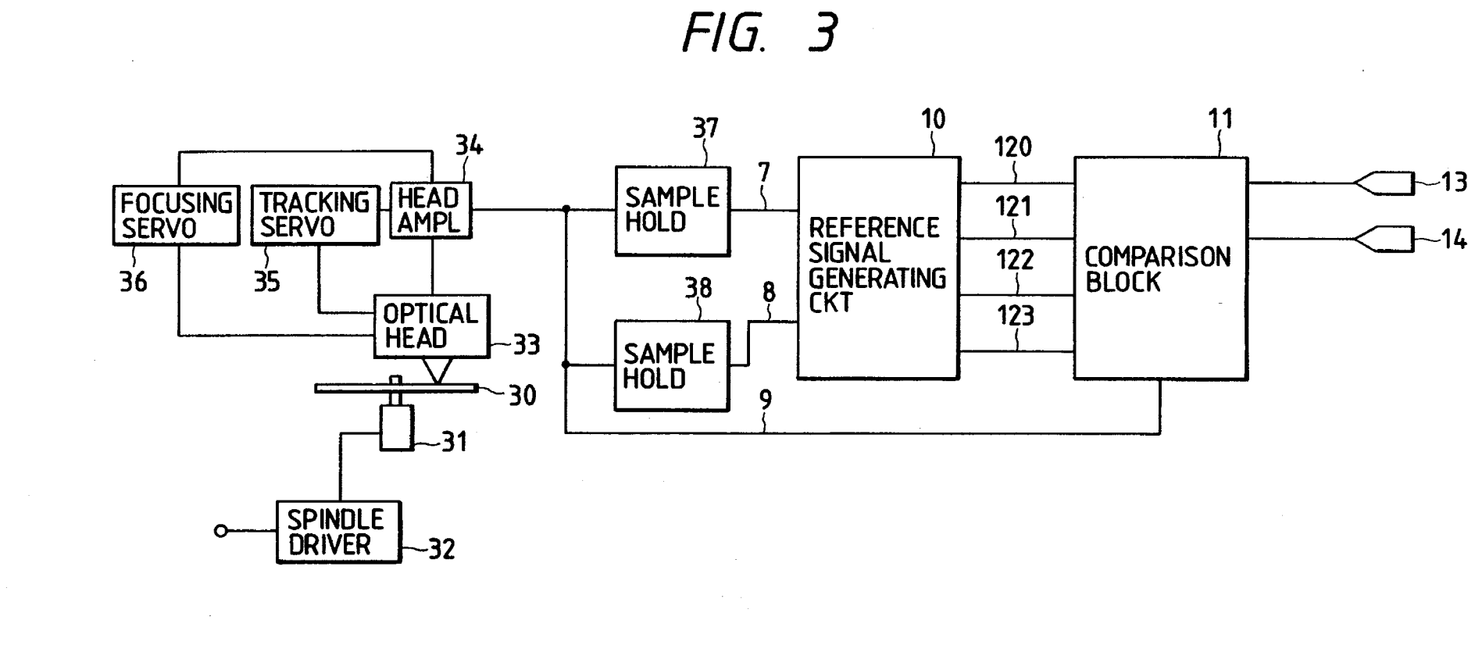
FIG. 3 is a schematic block diagram showing the reproduction system of the optical information recording/reproducing apparatus according to the present invention.

Referring to FIG. 3, a disk-like optical information recording medium 30 is driven by a spindle motor 31 with respect to an optical head 33. The spindle motor 31 is driven by a spindle driver 32. The optical head 33 optically records or reproduces information in or from the recording medium 30. A head amplifier 34 converts a beam reflected by the recording medium 30 and detected by the optical head 33 into an electrical output. A tracking servo mechanism 35 performs tracking servo of the optical head 33 on the recording medium 30. A focusing servo mechanism 36 performs focusing servo for focusing a beam from the optical head 33 on the recording medium 30. A sample hold circuit referred to as an "S/H circuit" hereinafter) 37 holds a reproduction signal of the reference pit. An S/H circuit 38 holds a reproduction signal from the AF area. A signal line 7 transmits the reproduction signal having the maximum amplitude and corresponding to the beam reflected by the recorded reference pit at a depth of $\lambda/4$ in the data recording mode. In this case, the reproduction signal having the maximum amplitude has been held in the S/H circuit 37. A signal line 8 transmits the reproduction signal corresponding to a beam reflected by the AF area. This reproduction signal has been held in the S/H circuit 38. A signal line 9 transmits the reproduction signal corresponding to the beam reflected by the information pit of the data area. A reference signal generating circuit 10 is connected to the outputs of the S/H circuits 37 and 38. The reference signal generating circuit 10 generates reference signals 120 to 123 having four levels. The outputs of the reference signal generating circuit 10 are connected to a comparison block 11. The comparison block 11 compares the reference signals 120 to 123 with the reproduction signal from the data area. An output signal 13 corresponds to channel 0, and an output signal 14 corresponds to channel 1. Each channel signal is a binary digital signal.

An operation for reproducing information recorded on the optical information recording medium 30 will be described with reference to FIG. 3, assuming that the optical information recording medium 30 is being rotated by the spindle motor 31 at a predetermined speed (e.g., 2,400 rpm). The start and stop timings of the spindle motor 31 are controlled by the spindle driver 32 which is controlled by a conventional controller such as a microprocessor (not shown). In this state, the optical information recording medium 30 is irradiated with a laser beam emitted from the optical head, and a beam (i.e., a reproduction beam) which is reflected by the recording medium 30 is received by the optical head 33. An electrical signal corresponding to the reproduction beam is amplified by the head amplifier 34. AT is performed by the tracking servo mechanism 35 using the amplified signal. AF is also performed by the focusing servo mechanism 36.

Reproduction of information pits on the optical information recording medium 30 is performed by the optical head 33 in the same manner as in the AT and AF while the AT and AF are being performed. The reproduction signal from the optical head 33 is amplified by the head amplifier 34, and the amplified signal is supplied to the S/H circuits 37 and 38 and the comparison block 11. The reproduction signal from the reference pit 6 is sampled by the S/H circuit 37, and the sampled value is held therein. The reproduction signal from the AF area 4 is sampled by the S/H circuit 38, and the sampled value is held therein. Since the position of the reference pit is known in the recording mode, the S/H circuits 37 and 38 sample the reproduction signals at predetermined timings on the basis of a reference clock generated on the basis of the phase reference pit. Outputs from the S/H circuits 37 and 38 are input to the reference signal generating circuit 10 through the signal lines 7 and 8, respectively. The reference signal generating circuit 10 generates reference signals having different levels, the number of which corresponds to the number of reference signals corresponding to the quantization levels (as described in detail below). In this embodiment, the reference signal generating circuit 10 generates the four reference signals 120 to 123 having different levels. These reference signals are maintained by the holding operations of the S/H circuits 37 and 38 until new reference signals are generated from the next reference pit.

Figures 6, 7A:
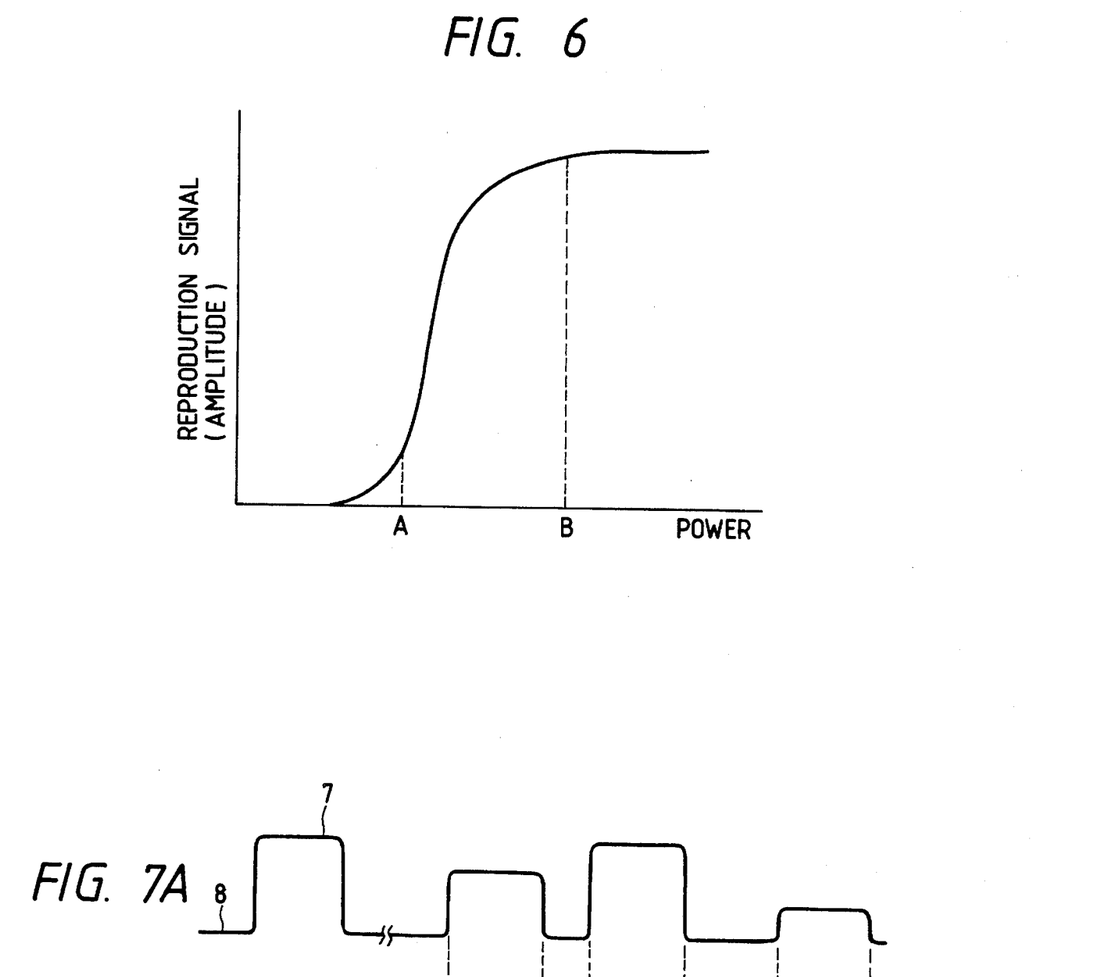
FIG. 6 is a graph showing the reproduction signal amplitude as a function of the beam power.
FIGS. 7A and 7B are timing charts showing channel signals and the corresponding recording or reproduction signals.

A reproduction signal 9 reproduced by the information pit from the data area is compared with the reference signals 120 to 123 by the comparison block 11. For example, when the input reproduction signal 9 has a waveform, as shown in FIG. 7A, two-channel signals are output upon comparison between the reproduction signal 9 and the reference signals 120 to 123. These channel signals are represented as output signals 13 and 14 in FIG. 7B, respectively. When a binary value of the output signals 14 and 13 at time t1 is obtained, it is 01; when, at time t2, 11; and when, at time t3, 10.

Figure 4:
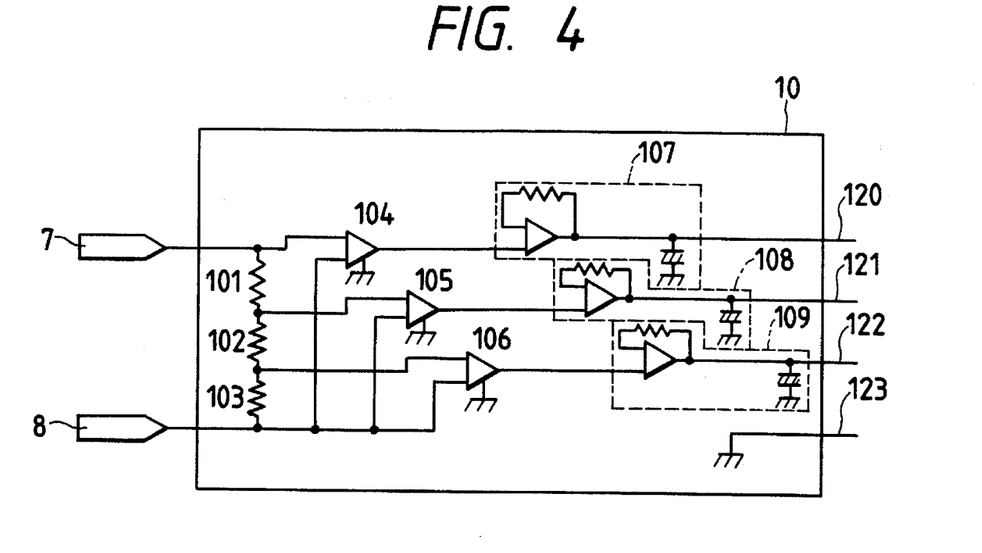
FIG. 4 is a diagram showing a reference signal generating circuit of FIG. 3.

The reference signal generating circuit 10 is described in detail with reference to FIG. 4 which shows reference signal generating circuit 10. The reference signal generating circuit 10 includes voltage-dividing resistors 101 to 103, transducers 104 to 106, and integrators 107 to 109. The signal line 7 transmits the reproduction signal having the maximum amplitude corresponding to the beam reflected by the reference pit 5, and the signal line 8 transmits the reproduction signal having a level corresponding to the beam reflected by the AF area. Reference signal lines 120 to 123 are output lines of the reference voltage generating circuit 10.

Signals input from the signal lines 7 and 8 are voltage-divided by the voltage-dividing resistors 101 to 103 in accordance with their potential differences. The potential differences across the voltage-dividing resistors 101 to 103 are respectively transformed into voltages by the transformers 104 to 106 with reference to the ground level. The voltages are then input to the integrators 107 to 109, respectively. The integrators 107 to 109 integrate the voltages to maintain the reference potentials. The reference signals are output to the comparison block 11 through the reference signal lines 120 to 123. Signal line 123 is a ground level line, and that the voltage division levels are determined by the data levels.

Figure 5:
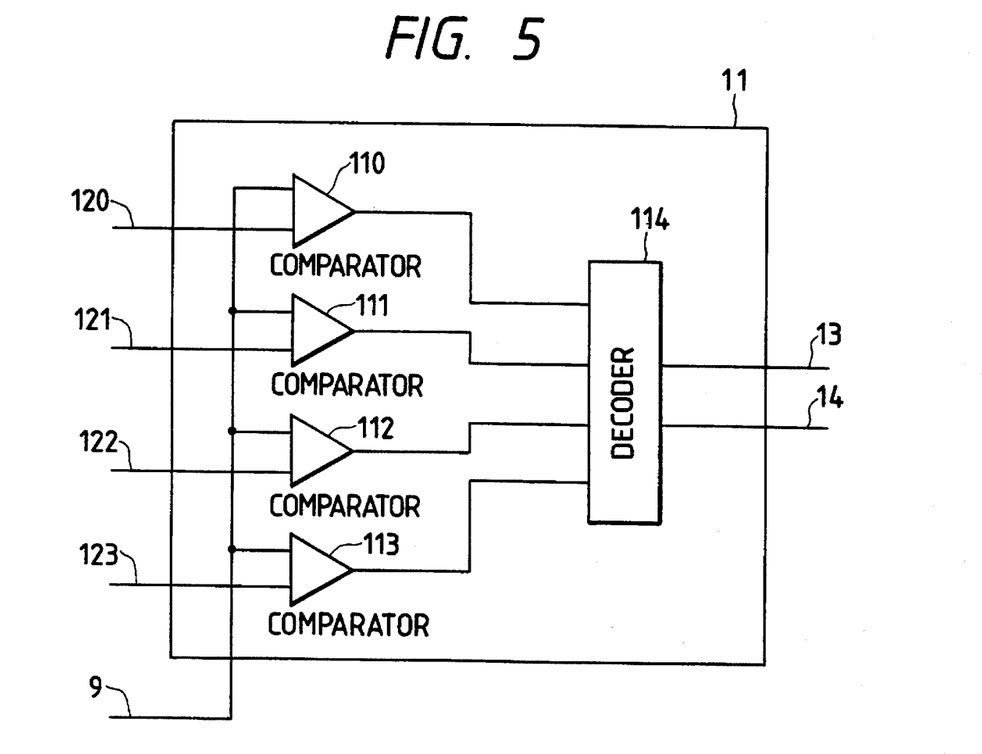
FIG. 5 is a block diagram of a comparison block shown of FIG. 3.

The comparison block 11 is described with reference to FIG. 5 which shows an arrangement of the comparison block 11. The comparison block 11 comprises comparators 110 to 113 and a decoder 114. A reproduction signal reproduced from the information pit of the data area and input to the comparison block 11 through the signal line 9 is input to the comparators 110 to 113. The input reproduction signal is compared with the four reference levels input through the four reference signal lines 120 to 123. These comparison results are used to identify the reproduction signal level, and the identification result is decoded into the two channel signals 13 and 14 by the decoder 14.

The two channel signals can be reproduced by the identification result as follows. Since a recording level is changed by combinations of the two channel signals during data recording, the depth of the pit is changed on the basis of the change in recording level. The level (amplitude) of the reproduction signal is changed accordingly. When the level is identified, any combination of the signals can be discriminated. This discrimination operation will be described in detail later.

The way of recording multi-value information of a reproduction signal in the form of pits will be described with reference to FIG. 6. FIG. 6 is a graph showing the reproduction signal amplitude as a function of the laser beam recording power. The characteristics shown in FIG. 6 are general in a WORM type optical disk. As is apparent from the graph, no pit is formed in the recording medium at a position where a laser beam power does not reach a threshold value A. A reproduction beam amplitude is increased with an increase in power from the threshold value A to a point B although this increase is nonlinear. The reproduction signal amplitude undergoes almost no change after the point B even if the laser power is increased. That is, a region after the point B is a saturation region. These characteristics are taken into consideration to examine the level of accurate quantization taken together with the signal to noise (S/N) ratio within the region between the value A and the point B, thereby determining the number of divisions.

Even in the most popular WORM type optical disks, a C/N of about 60 dB can be obtained. If the number of divisions, i.e., levels is four, a C/N of about 48 dB can be assured as follows:

60 $dB=20 \times \log x$ for $x=10^3$ to $10^3/4=250$ $y=20 \times \log 250 \fallingdotseq 48$ $dB$ Therefore, a sufficient multi-value arrangement can be obtained. When the number of divisions is determined, the laser power corresponding to the number of divisions is set in consideration of the levels of the reference signals generated by the reference signal generating circuit 10.

Figure 8:
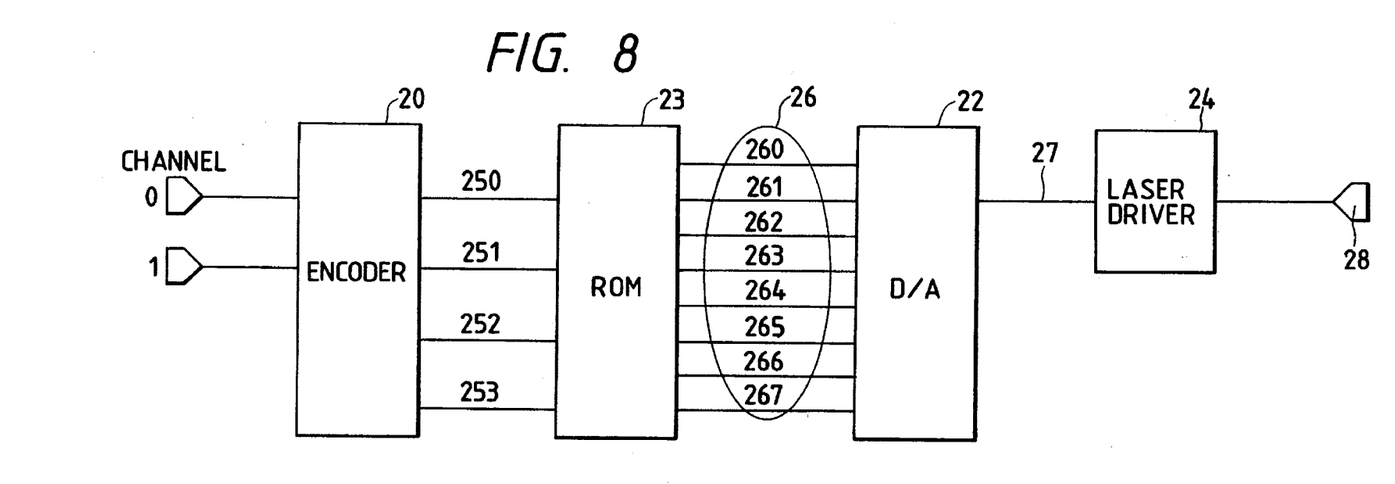
FIG. 8 is a block diagram of a recording system in the optical information recording/reproducing apparatus of the present invention.

FIG. 8 is a block diagram of a recording system according to the present invention in which the recording system comprises an encoder 20, encoder output lines 250 to 253, a ROM 23, data output lines 26 (260–267) of the ROM 23, a digital/analog converter ("referred to as a" D/A converter hereinafter) 22, an analog output line 27 of the D/A converter 22, and a laser driver 24. Data outputs from the ROM 23 are transmitted to the D/A converter 22 through the signal lines 260 to 267.

Figure 7B:
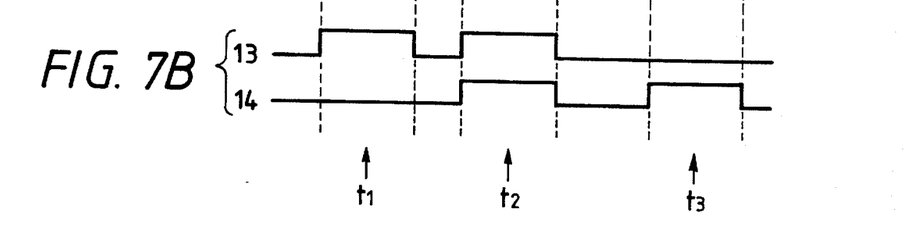

A method of recording two channel signals shown in FIG. 7(b) will be described with reference to FIG. 8.

Figure 9:
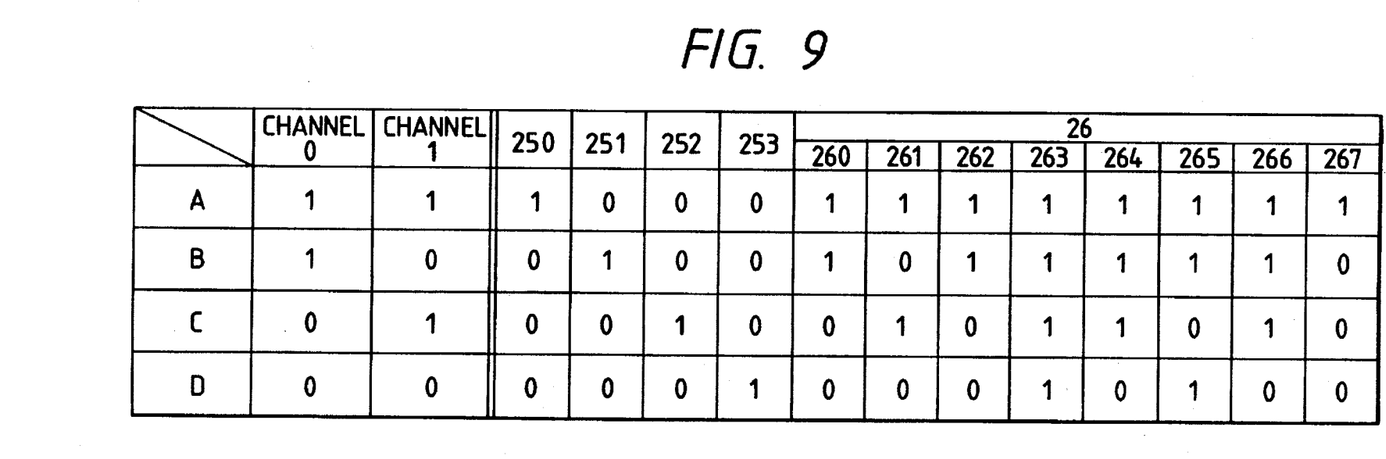
FIG. 9 is a table showing signal states in the block diagram of FIG. 8.

FIG. 9 is a table showing signal states of the respective components in the block diagram of the recording system according to the present invention. In the table shown in FIG. 9, A, B, C, and D represent combinations of channel 0 and channel 1. For example, combination A represents a combination of channel 0 of "1" and channel 1 of "1". Rows below numerals 250 to 253 and 26 represent states of the signal lines shown in FIG. 8.

Signal states of combination A will be exemplified below. Two signals input as signals of channel 0 and channel 1 supplied from a conventional information source (not shown) are encoded by the encoder 20, as shown in FIG. 9. An encoded output is connected to the address lines of the ROM 23 through the signal lines 250 to 253. In combination A, "1000" as an address is supplied to the ROM 23. The ROM 23 outputs to the data output lines 26 data stored at the address corresponding to the address input. In combination A, the output data is "11111111". The D/A converter 22 converts the input digital signal, i.e., the data output from the ROM 23, into an analog signal. The analog signal is output to the analog output line 27. The laser driver 24 drives a semiconductor laser 28 through a signal line 28 in accordance with this laser signal. Note that the data stored in the ROM 23 corresponds to a plurality (i.e., the number of divisions) of laser power levels set on the basis of FIG. 6.

That is, when the analog signal based on these data is sent to the laser driver 24, the laser driver 24 controls an injection current supplied to the semiconductor laser 28 on the basis of the data to cause the semiconductor laser 28 to generate a laser output corresponding to said power levels. The ROM 23 is used to set the recording power due to the following reason. Since the recording characteristics are nonlinear with respect to the laser power in optical recording, the reference levels having four different values are not always equidistantly divided.

In the above embodiment, the ROM outputs from the output lines 26 are set, as shown in FIG. 9, in accordance with the combinations of channel 0 and channel 1. However, these set values may be arbitrarily changed.

As is apparent from the above description, the signal states of combinations B, C, and D in FIG. 9 can be similarly obtained.

When a laser light is emitted from the laser 28 on the basis of the recording power information, a pit having a predetermined depth corresponding to the laser power can be formed on the recording medium.

In the recording mode, a laser light is controlled to record a reference pit having a depth of λ/4 at a predetermined position of the sample servo byte before or after or both before and after data is recorded. When the recorded result is reproduced by the reproducing scheme described above, multi-value information can be obtained.

In this case, in order to practice the optical recording/reproducing method according to the present invention, conventional optical systems such as recording and reproducing optical systems can be used without modifications. As described above, when a 2-channel signal system for a transfer rate is taken into consideration, the transfer rate can be simply doubled in the modulation/demodulation system as in the conventional optical recording/reproducing system.

Figure 10:
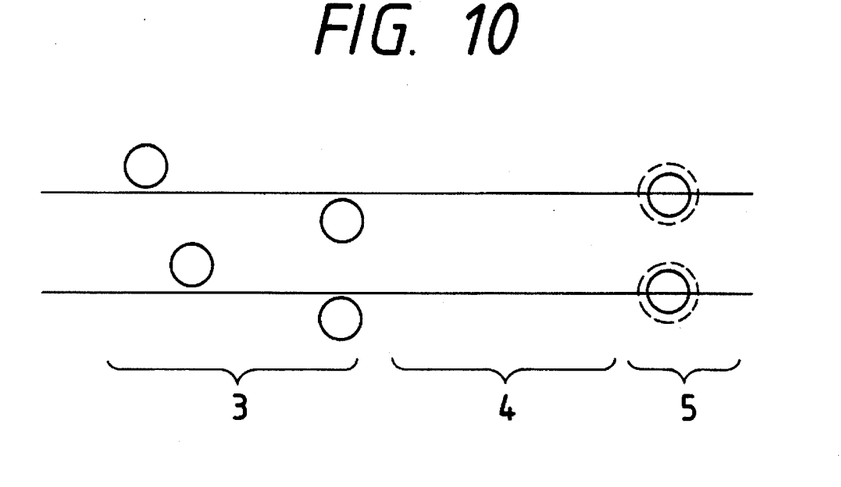
FIG. 10 is a schematic view showing reference pits according to another embodiment of the present invention.

In the above embodiment, the reference pit 6 is recorded at a portion following the servo byte pit. However, the PLL pit 5 may be preformatted to have a depth of λ/4 and may also serve as the reference pit 6 (FIG. 10).

The number of reference pits recorded in one track need not be the number of servo byte pits. That is, in a small area where the recording medium characteristics are constant, only one reference pit is formed. In this case, accurate signal reproduction free from characteristic variations depending on different locations of the recording medium can be achieved.

In the above embodiment, a plurality of reference signals are formed on the basis of the reproduction signal obtained from the reference pit formed on the recording medium, and multi-data is reproduced by using the reference signals. However, a plurality of reference pits having different reproduction signal levels may be formed such that the reproduction signal from the reference pit is directly used as a reference signal for reproducing the multi-value data.

Even if the characteristics of the recording medium shown in FIG. 6 are deteriorated over time upon simultaneous recording of information and the reference pit, the characteristics in the information recording mode can be obtained as a reproduction signal from the reference pit, and excellent signal reproduction can be maintained. In this manner, since the reference pit plays an important role in multi-value recording, a plurality of pits are prepared for each data to prevent read errors, thereby improving reproduction reliability.

As has been described above in detail, according to the present invention, a reference pit which represents a reproduction signal having a maximum amplitude is recorded during data recording, and the laser recording power is controlled based on the reference pit in a nonsaturation region where the reproduction signal amplitude is changed as a function of a change in laser power to form an information pit. In the reproduction mode, a plurality of reference signals are generated to reproduce multi-value information. The data transfer rate and hence the recording density can be increased. This can be achieved by utilizing the conventional techniques with advantages in fabrication of the recording media and their use.

The present invention is not limited to the particular embodiments described above. Various changes and modifications may be made within the spirit and scope of the invention. For example, the information pit forms are not limited to the ones exemplified in the above embodiments. These application examples are incorporated in the present invention without departing from the scope of the appended claims.

What is claimed is:

1. An information recording and reproducing method for recording multiple value digital information on an information recording medium and reproducing the multiple value digital information, the recording medium including at least first and second portions, said method comprising the steps of:

recording, by using an optical recording head, a reference mark on the first portion of the information recording medium;

thereafter, recording, by using the optical recording head, the multiple value digital information, the multiple value digital information being recorded on the second portion of the recording medium separate from the first portion of the recording medium on which the reference mark is recorded;

reading the reference mark;

generating a threshold signal on the basis of a peak value of a reference signal, which is obtained by reading the reference mark;

reading the multiple value digital information as an analog signal; and reproducing the multiple value digital information as a multiple value digital signal by comparing the analog signal with the threshold signal.

2. A method according to claim 1, further comprising emitting, from the recording head, a modulated laser light to irradiate the recording medium, recording the multiple value digital information and the reference information by irradiating the recording medium with the modulated laser light, and recording the multiple value digital information as a train of plural multiple value digital pits and recording the reference mark as a reference pit; and further comprising reading the multiple value digital information and the reference mark by irradiating the recording medium with a non-modulated laser light.

3. A method according to claim 2, wherein a depth of the reference pit is one-fourth of a wavelength of the modulated laser light.

4. A method according to claim 3, wherein a depth of the multiple value digital pits are less than one-fourth of a wavelength of the laser light used to read the recording medium.

5. A method according to claim 4, wherein the threshold signal comprises plural signals.

6. A method according to claim 4, wherein the multiple value digital information includes at least two information channels.

* * * * *

UNITED STATES PATENT AND TRADEMARK OFFICE
CERTIFICATE OF CORRECTION

PATENT NO. : 5,617,390          Page 1 of 2
DATED : April 1, 1997
INVENTOR(S) : Katsumi IIJIMA, et al.

It is certified that error appears in the above-identified patent and that said Letters Patent is hereby corrected as shown below:

ON THE COVER:

Under item [57] "Abstract":

Line 7, "optically" should read --optical--.

COLUMN 1:

Line 16, "optical information and." should read --information.--; and
Line 61, "field" should read --fields--.

COLUMN 2:

Line 23, "in" should be deleted;
Line 48, "on" should read --of--; and
Line 60, "shown" should be deleted.

UNITED STATES PATENT AND TRADEMARK OFFICE
CERTIFICATE OF CORRECTION

PATENT NO. : 5,617,390
DATED : April 1, 1997
INVENTOR(S) : Katsumi IIJIMA, et al.

It is certified that error appears in the above-identified patent and that said Letters Patent is hereby corrected as shown below:

COLUMN 3:

Line 67, "referred" should read --(referred--.

COLUMN 6:

Line 24, "("referred" should read --(referred--, and "a" D/A converter" should read --a "D/A converter"--.

Signed and Sealed this

Twenty-fifth Day of November, 1997

Attest:

BRUCE LEHMAN

Attesting Officer

Commissioner of Patents and Trademarks